(12) United States Patent
Murphy

(10) Patent No.: US 7,659,479 B2
(45) Date of Patent: Feb. 9, 2010

(54) TOOL FOR INSTALLING ELECTRICAL BOXES

(76) Inventor: Robert Murphy, 1081 State Route 28, No. 215, Milford, OH (US) 45150

( * ) Notice: Subject to any disclaimer, the term of this patent is extended or adjusted under 35 U.S.C. 154(b) by 0 days.

(21) Appl. No.: 12/123,835

(22) Filed: May 20, 2008

(65) Prior Publication Data

US 2008/0283266 A1 Nov. 20, 2008

Related U.S. Application Data

(63) Continuation-in-part of application No. 11/420,925, filed on May 30, 2006, now Pat. No. 7,373,730.

(51) Int. Cl.
*H01H 9/02* (2006.01)

(52) U.S. Cl. .............. 174/58; 174/50; 174/53; 174/57; 33/528; 248/906

(58) Field of Classification Search .......... 174/50, 174/53, 58, 57; 220/3.2, 3.3, 3.6, 4.02; 248/906, 248/343; 33/528, 613
See application file for complete search history.

(56) References Cited

U.S. PATENT DOCUMENTS

| | | | |
|---|---|---|---|
| 4,507,869 A | 4/1985 | Stude | |
| 4,850,115 A | 7/1989 | Price et al. | |
| 4,890,391 A | 1/1990 | Warren | |
| 5,111,593 A | 5/1992 | Gehen, Sr. | |
| 5,136,788 A | 8/1992 | Jackson | |
| D335,462 S | 5/1993 | Shaw | |
| 5,222,303 A | 6/1993 | Jardine | |
| 5,615,490 A | 4/1997 | Burchell | |
| 5,860,219 A | 1/1999 | Wilkinson | |
| 5,966,828 A | 10/1999 | Hickey | |
| 6,233,838 B1 | 5/2001 | Falwell et al. | |
| 6,430,827 B2 | 8/2002 | Ruther | |
| 6,473,983 B1 | 11/2002 | Gier | |
| 6,803,521 B2 * | 10/2004 | Vrame | 174/58 |
| 6,958,448 B2 | 10/2005 | Nave | |
| 7,439,443 B2 * | 10/2008 | Dinh | 174/58 |
| 2004/0049933 A1 | 3/2004 | Hicks | |
| 2006/0265893 A1 | 11/2006 | Gifford | |

* cited by examiner

*Primary Examiner*—Dhiru R Patel
(74) *Attorney, Agent, or Firm*—Wood, Herron & Evans, LLP

(57) ABSTRACT

A tool for installing various configurations of electrical boxes to framing studs during building construction includes a staff having graduations indicating distances from an end of the staff. A mounting fixture is slidably disposed on the staff and can be secured at a desired position along the length of the staff corresponding to a desired installation height for the electrical boxes. The mounting fixture may include pins for engaging apertures on an electrical box, and magnets for magnetically engaging metal electrical boxes, to help retain the electrical boxes on the mounting fixture during installation.

10 Claims, 12 Drawing Sheets

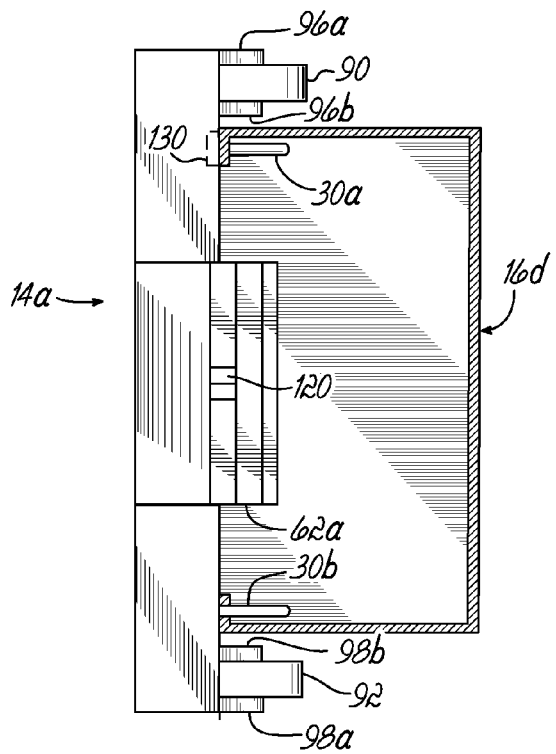
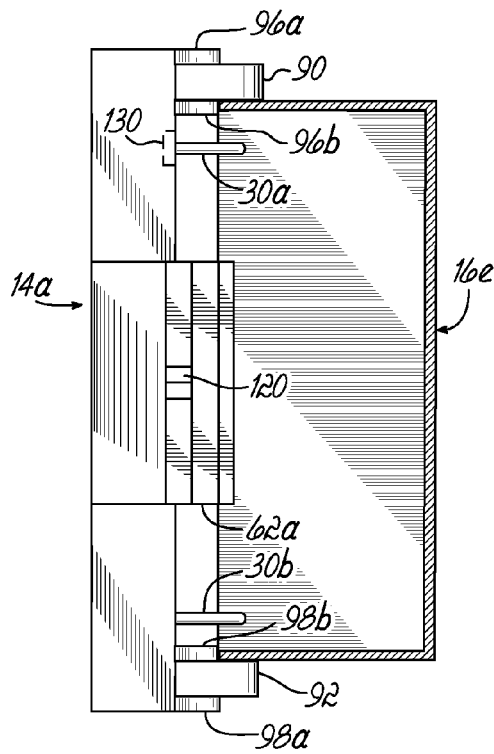
FIG. 10A  FIG. 11A
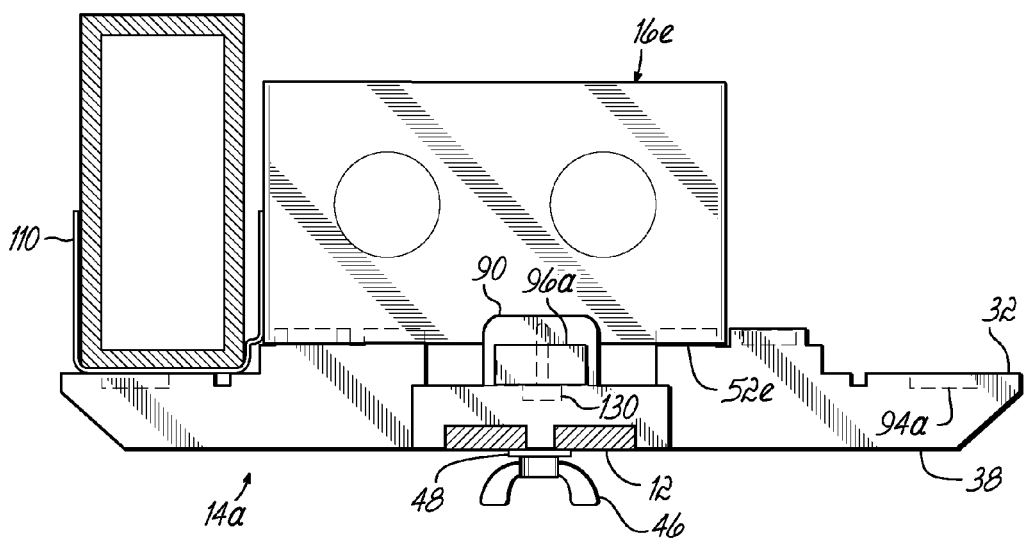
FIG. 11

TOOL FOR INSTALLING ELECTRICAL BOXES

This Application is a continuation-in-part of U.S. patent application Ser. No. 11/420,925, filed May 30, 2006 (pending), the disclosure of which is incorporated by reference in its entirety.

FIELD OF THE INVENTION

The present invention relates generally to building construction, and more particularly to a device to facilitate installing electrical boxes on wooden and metal framing studs.

BACKGROUND OF THE INVENTION

Residential and commercial buildings are typically constructed using wooden or metal framing studs. The framing studs support wall panels made from drywall or other materials that are used to finish interior rooms in buildings. During construction, electrical boxes for housing switches, outlets, and various electrical controls are typically mounted to the framing studs prior to installation of the wall panels. The electrical boxes are generally installed at uniform heights above a floor surface, and must be positioned to allow installation of the wall panels such that front edges of the electrical boxes are flush with the front surfaces of the wall panels. For example, electrical boxes are typically set out from a forward surface of wooden framing studs so that a sheet of drywall, or other wall panel, may be placed over the stud with the front edge of the box aligned flush with the outer surface of the drywall. Electrical boxes used with metal framing studs may be mounted with a front edge of the box set out, set back, or flush with a forward surface of the stud, depending on the type of electrical box used.

Typically, persons installing electrical boxes on studs will determine the positions for the boxes by measuring and marking a horizontal distance from the front or outer surface of the stud (corresponding to a drywall thickness) using a tape measure. A vertical distance from the floor along the stud is then measured and marked to indicate a desired height of the switch or outlet to be carried by the electrical box. When wood framing studs are used, electrical boxes are generally nailed to the studs at the measured locations. With metal studs, holes are drilled in the studs at the marked positions, and the electrical boxes are attached thereto using self-tapping screws or bolts. This procedure is relatively inaccurate and frequently results in incorrect positioning of electrical boxes. When errors occur, the wall panels will not be flush with the edges of the electrical boxes, or the electrical boxes will not be provided at uniform heights from the floor surface. Correction of these errors results in inconvenience and delay, and rework of improperly installed electrical boxes often detracts from the appearance of the finished wall surface.

While various devices have been proposed to facilitate installing electrical boxes to framing studs, these prior devices are generally not adapted to accommodate the wide variety of electrical boxes used in building construction. A need therefore exists for a tool that facilitates accurately installing electrical boxes with minimal effort and time, and overcomes shortcomings of the prior art, such as those described above.

SUMMARY OF THE INVENTION

The present invention overcomes the foregoing and other shortcomings and drawbacks of tools and guides heretofore known for use in installing electrical boxes to framing studs. While the invention will be described in connection with certain embodiments, it will be understood that the invention is not limited to these embodiments. On the contrary, the invention includes all alternatives, modifications and equivalents as may be included within the spirit and scope of the present invention.

According to one aspect of the present invention, a tool for installing electrical boxes comprises an elongate staff and at least one electrical box mounting fixture slidably adjustably disposed on the staff. The staff has graduations that indicate distances from an end of the staff. The staff includes at least first and second sections that are convertible between a first configuration wherein the first and second sections are coupled together in an end-to-end arrangement, and a second configuration wherein the first and second sections disposed in a side-to-side arrangement. When the staff is placed on the floor of a building, electrical boxes supported on the mounting fixture will be positioned at a desired mounting height.

According to another aspect of the invention, the mounting fixture has a first planar surface for engaging an electrical box, and a second planar surface spaced from the first planar surface, for engaging a framing stud. The spacing between the first and second planar surfaces defines a mounting depth position for the electrical boxes, relative to the framing stud. In some embodiments, the mounting depth corresponds to the thickness of wall panels that will be installed on the framing studs, whereby the electrical boxes will be positioned with their front edges flush with wall panels.

In yet another aspect of the invention, the staff includes a plurality of detents that are configured for cooperation with the mounting fixture to facilitate aligning the mounting fixture in registration with one of the graduations on the staff.

These and other features, objects and advantages of the invention will become more readily apparent to those skilled in the art in view of the following detailed description, taken in conjunction with the accompanying drawings.

BRIEF DESCRIPTION OF THE DRAWINGS

The accompanying drawings, which are incorporated in and constitute a part of this specification, illustrate embodiments of the invention and, together with the general description of the invention given above, and the detailed description given below, serve to explain the principles of the invention.

FIG. 10A is a cross-sectional side view of the tool and electrical box of FIG. 10.

FIG. 11 is a top view of FIG. 6, illustrating use with a steel, 4-inch×4-inch, commercial electrical box.

FIG. 11A is a cross-sectional side view of the tool and electrical box of FIG. 11.

DETAILED DESCRIPTION

Figure 1:
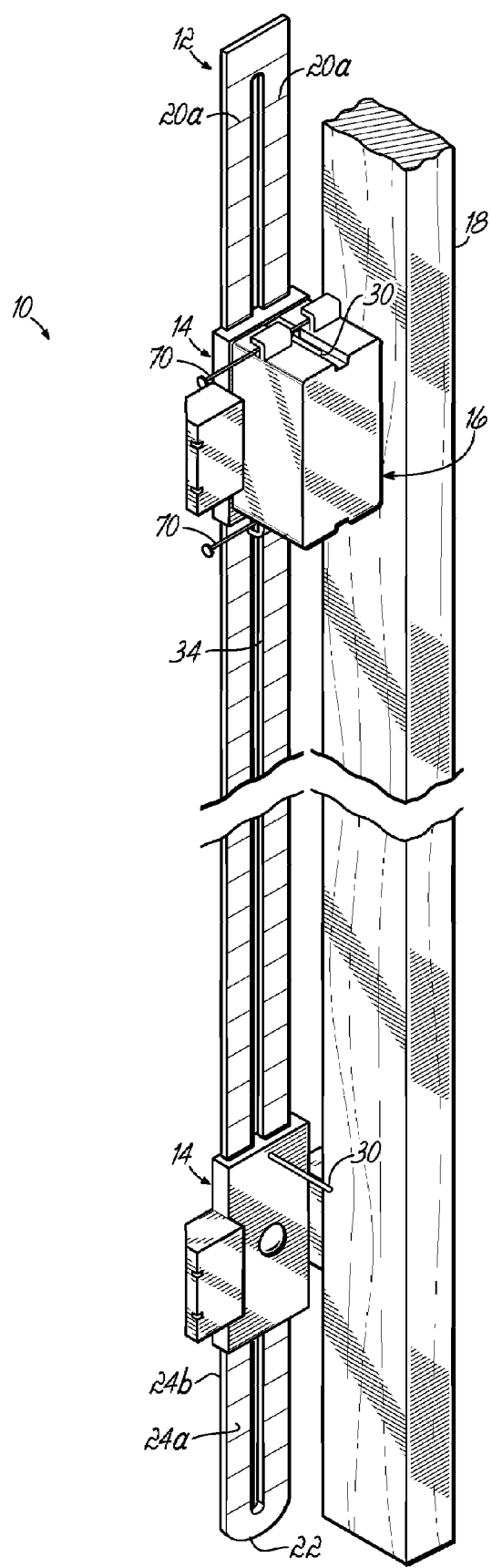
FIG. 1 is a perspective view of a tool for installing electrical boxes, in accordance with the principles of the present disclosure.
Figure 2:
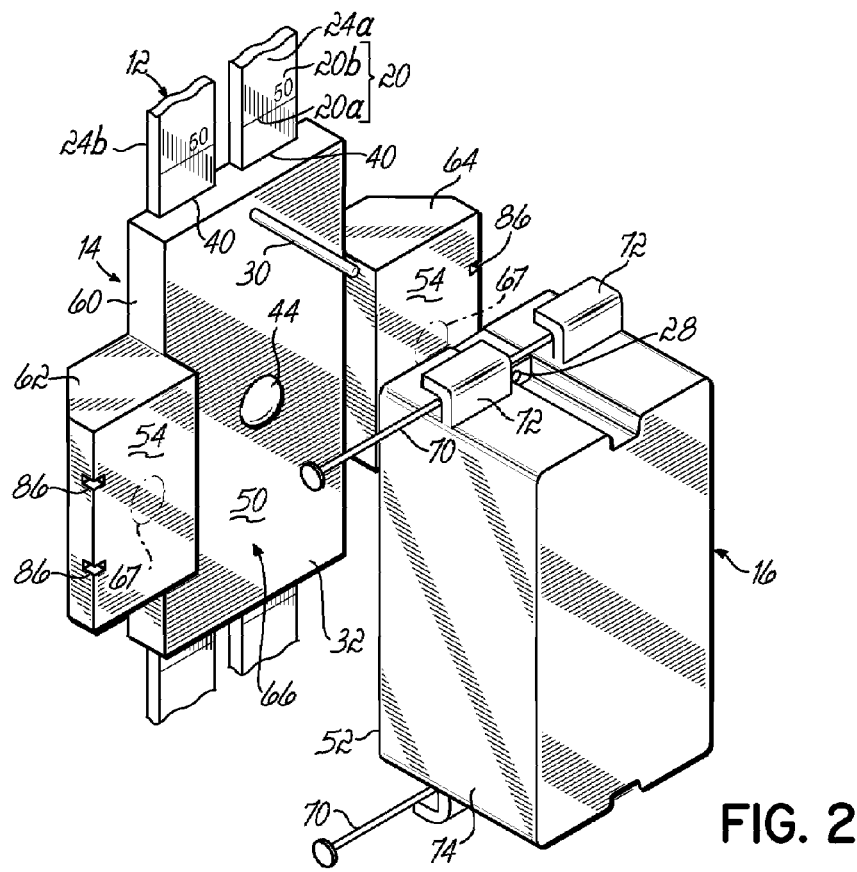
FIG. 2 is an enlarged detail view of the tool of FIG. 1, illustrated with an electrical box removed to show detail.
Figure 4:
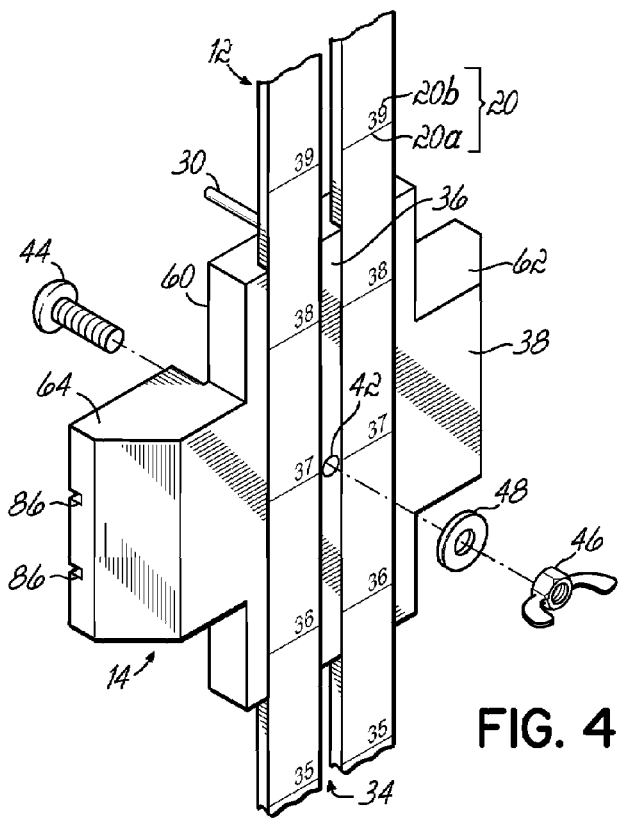
FIG. 4 is a partially exploded perspective view of the tool of FIG. 3.

FIGS. 1-4 depict an exemplary tool 10 for installing electrical boxes, in accordance with the principles of the present invention. The tool 10 includes an elongate staff, or ruler, 12 supporting one or more electrical box mounting fixtures 14 thereon. The electrical box mounting fixtures 14 are slidably adjustable along the length of the staff 12 to desired positions for mounting the electrical boxes 16 to a framing stud 18 of a building. Graduations 20 are provided on the staff 12 to define various distances from a lower end 22 of the staff 12 to facilitate locating the electrical boxes 16 at desired heights above a floor surface. The graduations 20 may comprise hash marks 20a, reference numerals 20b corresponding to distances from the lower end 22 of the staff 12, or various other indicia. In one embodiment, graduations 20 are provided on opposite sides 24a, 24b of the staff 12. The graduations 20 on one side 24a of the staff 12 may be provided in a different unit of measure, or in a different measurement system than the graduations 20 provided on the oppositely disposed side 24b of the staff 12, to facilitate use of the tool 10 with different measurement systems. For example, graduations 20 on one side 24a of the staff 12 may be provided in inches, while graduations 20 on the opposite side 24b of the staff 12 may be provided in centimeters.

With continued reference to FIGS. 1-4, the mounting fixture 14 includes a pin 30 extending from a first side 32 of the mounting fixture 14 for engaging and supporting electrical boxes 16 thereon. Residential electrical boxes generally include apertures 28 (see FIG. 2) for receiving fasteners to mount switches, outlets, or other electrical hardware in the box. The pin 30 on mounting fixture 14 is sized to be received through these apertures 28 on an electrical box 16. In one embodiment, the pin 30 is formed from stainless steel, or other non-magnetic material, and is approximately 1 1/8 inch long and approximately 1/8-inch in diameter. In another embodiment, the pin 30 is provided in a location on the mounting fixture 14 such that an electrical box 16 placed onto the fixture 14 and engaging the pin 30 will have its vertical center spaced a distance from the lower end 22 of the staff 12 corresponding to a distance indicated by the graduations 20 on the staff 12.

In the embodiments shown, staff 12 includes a longitudinally extending slot 34 formed therethrough. An elongate tongue 36 extending from a second side 38 of the mounting fixture 14 engages the slot 34 to facilitate slidable adjustment of the mounting fixture 14 along the length of the staff 12. In this embodiment, the tongue 36 is defined by a pair of parallel grooves 40 formed into the second side 38 of the mounting fixture 14. The grooves 40 are configured to receive the staff 12 therein, such that a portion of the staff 12, between an outer edge of the staff 12 and the slot 34, is received within each of the grooves 40. An aperture 42 is formed through the tongue 36, and extends between the first and second sides 32, 38 of the mounting fixture 14 for receiving a bolt 44 therethrough, so that mounting fixture 14 may be secured at a desired position along the length of the staff 12. Accordingly, the mounting fixture 14 may be slidably adjusted along the length of the staff 12 to a position corresponding to a desired height of the electrical box 16 from the end 22 of the staff 12, whereafter a wing nut 46 may be manipulated to tighten and clamp the staff 12 and mounting fixture 14 between a washer 48 and the bolt 44. While a bolt 44, wing nut 46, and washer 48 have been shown and described herein to facilitate securing the mounting fixture 14 to the staff 12, it will be recognized that various other fasteners or securing devices may be used to secure the mounting fixture 14 to the staff 12 at a desired location. In one embodiment, the location of the bolt 44 corresponds to the vertical center of an electrical box 16 mounted on the fixture 14, and the bolt 44 or other fastener may be used in cooperation with graduations 20 to indicate the position of the box 16 on the staff 12 relative to end 22 of staff 12. Alternatively, various other reference features may be provided on the tool 10 to indicate a desired position of an electrical box or other fixture with respect to the end 22 of the staff 12.

The mounting fixture 14 further includes a first planar surface 50 on first side 32 for engaging the front edge 52 of an electrical box 16, and at least one second planar surface 54 on the front side 32 for engaging a framing stud 18 to facilitate positioning the electrical box 16 relative to the framing stud 18. The first and second planar surfaces 50, 54 are spaced relative to one another to define a desired set-out depth of the electrical box relative to a forward surface of the framing stud 18. For example, when the tool 10 is used to mount an electrical box 16 to a wooden stud 18, typically used in residential construction, it is generally desired to mount the electrical box 16 with a forward edge 52 of the box 16 set out a distance from the front surface 56 of the stud 18 corresponding to a thickness of a wall panel that will subsequently be mounted to the stud 18, as depicted in FIGS. 3 and 5A.

In the embodiment shown in FIGS. 1-4, the mounting fixture 14 comprises a central portion 60, and first and second side portions 62, 64 extending laterally from the central portion 60, on opposite sides thereof. The first planar surface 50 is provided on the central portion 60 and the second planar surface 54 is defined by outwardly projecting parts of side portions 62, 64 which are spaced from the first planar surface 50. The side portions 62, 64 cooperate with the central portion 60 to define a channel 66 therebetween for receiving a single-gang electrical box 16, as will be described below. The channel 66 cooperates with the pin 30 on the central portion 60 to facilitate properly positioning the electrical box 16 on the mounting fixture 14. In one embodiment, the channel 66 is approximately 1.3 inches wide, and the first planar surface 50 is spaced approximately ½-inch from the second planar surface 54 to correspond to a set-out depth for accommodating ½-inch thick drywall. It will be appreciated that various other spacings between the first and second planar surfaces 50, 54 may be provided, to accommodate different set-out depths for different drywall thicknesses. Mounting fixture 14 may further include magnets 67 provided on the first and second side portions 62, 64, to facilitate installing certain styles of electrical boxes as will be described below.

Figure 3:
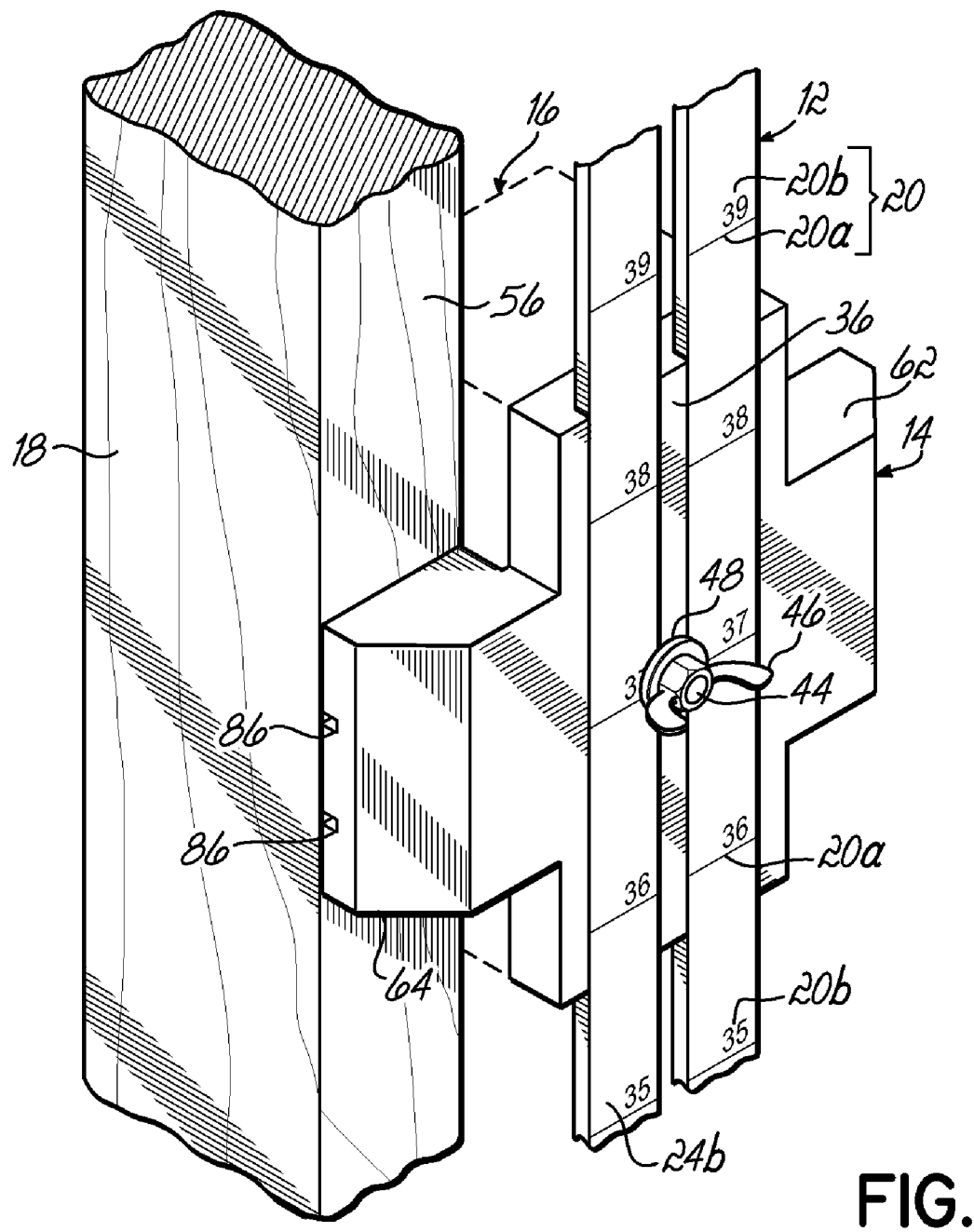
FIG. 3 is an enlarged perspective view of the tool of FIG. 1, viewed from the opposite side.
Figure 5A:
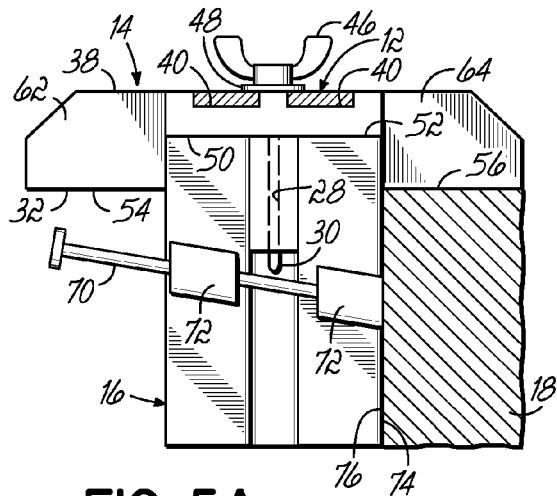
FIG. 5A is a top view of the tool of FIG. 1, illustrating use of the tool with a single-gang, plastic, residential electrical box.

FIG. 5A depicts the tool 10 of FIGS. 1-4, being used to mount a residential, single gang electrical box 16 to a wooden stud 18. The electrical box 16 will generally include one or more fasteners, such as nails 70, mounted to the box 16, for example, by tabs 72, whereby the box 16 may be secured to a framing stud 18 at the desired position. To install the electrical box 16 to the stud 18, fixture 14 is slidably adjusted along the length of staff 12 to a desired box mounting height indicated by the graduations 20. Electrical box 16 is then placed on mounting fixture 14, between side portions 62, 64, with the front edge 52 of the box 16 abutting the first planar surface 50 and pin 30 extending into the aperture 28. The tool 10, with electrical box 14 mounted thereon, is then positioned adjacent stud 18 with lower end 22 of the staff 12 contacting the floor surface and the second planar surface 54 of one of the side portions 62, 64 abutting the front surface 56 of stud 18, as depicted in FIGS. 1, 3 and 5A. A sidewall 74 of the electrical box 16 abuts an adjacent side 76 of the stud 18 and the electrical box 16 is positioned at the desired height and set-out, relative to the stud 18. Nails 70 may then be driven into the stud 18, as known in the art, to firmly secure the box 16 to the stud 18.

Figure 5C:
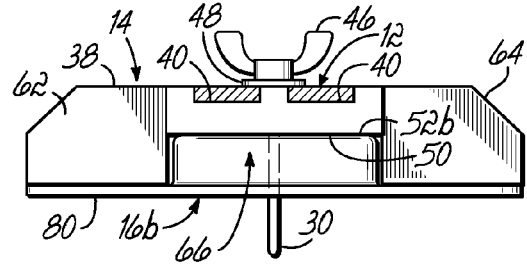
FIG. 5C is a top view of the tool of FIG. 1, illustrating use with a steel, 4-inch×4-inch, single-gang cover plate.
Figure 5B:
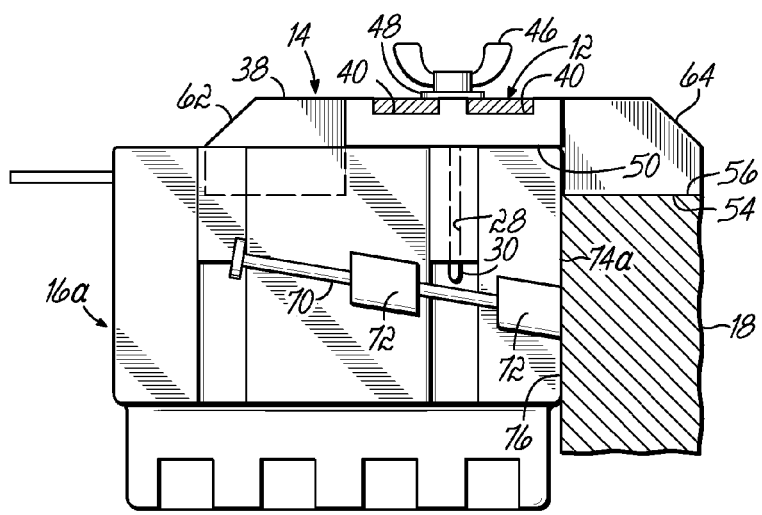
FIG. 5B is a top view of the tool of FIG. 1, illustrating use with a two-gang, plastic, residential electrical box.
Figure 9:
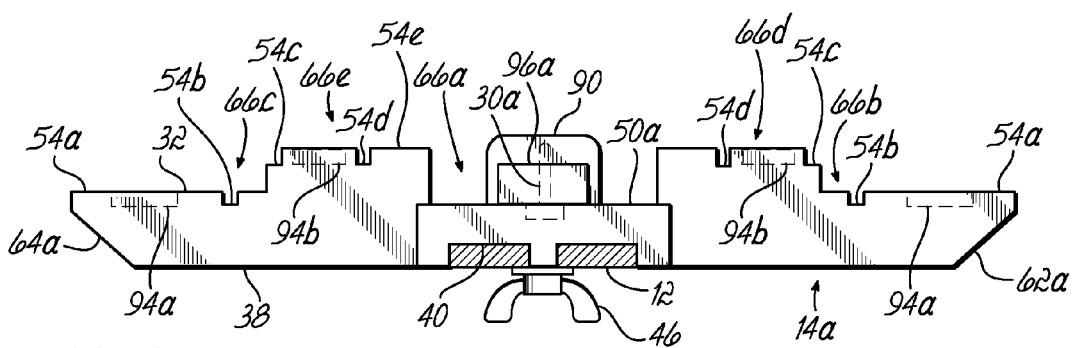
FIG. 9 is a top view of the tool of FIG. 6, rotated 180 degrees.

FIG. 5B illustrates use of the tool 10 of FIG. 1 with a two-gang electrical box 16a having nails 70 for securing the electrical box 16a to a wooden stud 18. The electrical box 16a is placed on the mounting fixture 14 with a sidewall 74a received in the channel 66 (FIG. 9) and adjacent one of the side portions 62, 64, and with pin 30 extending into one of the apertures 28. With the mounting fixture 14 set at a desired height indicated by the graduations 20 on the staff 12, the tool 10 is placed in abutting relation with a stud 18 such that the second planar surface 54, defined by one of the side portions 62, 64 of the mounting fixture 14, and a sidewall 74a of the electrical box 16a abut corresponding adjacent sides 56, 76 of the stud 18. The box 16a will then be positioned in the desired mounting location and the electrical box 16a may be secured to the stud 18, as described above.

FIG. 5C illustrates use of the tool 10 of FIG. 1 with a steel, 4-inch×4-inch, single-gang, flanged cover plate 16b. Such cover plates are conventionally used for mounting low-voltage electrical fixtures without an electrical box. The cover plate 16b is received within the channel 66 defined by the central portion 60 and the first and second side portions 62, 64. A front edge 52b of the cover plate 16b engages the first planar surface 50 and the flange 80 engages the second planar surfaces 54 on the side portions 62, 64 of the mounting fixture 14. Magnets 67 provided on the side portions 62, 64 magnetically engage the flange 80 to help retain the cover plate 16b on fixture 14. With the mounting fixture 14 positioned at the desired height indicated by the graduations 20, the cover plate 16b may be positioned on and secured to a stud 18, in a manner similar to that described above.

Figure 5D:
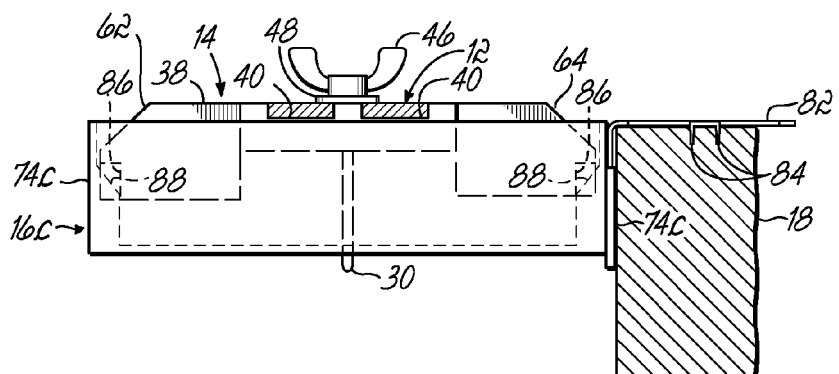
FIG. 5D is a top perspective view of the tool of FIG. 1, illustrating use with a 4-inch×4-inch electrical box having a nailing flange.

FIG. 5D illustrates use of the tool 10 of FIG. 1 with a 4-inch by 4-inch electrical box 16c having a self-nailing mounting flange 82. The electrical box 16c is mounted on the fixture 14 with its sidewalls 74c extending over the outer edges of the side portions 62, 64 of the mounting fixture 14, and with its upper and lower walls extending over the outer edges of the central portion 60. The mounting fixture 14 may include notches 86 (see FIGS. 2-4) on the outer edges of the side portions 62, 64 (shown in FIGS. 1-4) to accommodate wire-entry/wire-retaining features 88 (shown in dashed lines in FIG. 5D) conventionally found on plastic electrical boxes. The tool 10 is placed adjacent a framing stud 18, with a sidewall 74c and flange 82 abutting adjacent sides of the stud 18, whereby the electrical box 16c will be positioned at a desired distance from a floor surface, as indicated by the graduations 20 on the staff 12. The electrical box 16c may be secured to the stud 18 by hammering tines 84 provided on the mounting flange 82 into the stud 18, as known in the art.

FIGS. 6-9 depict another exemplary tool 10a for installing electrical boxes to framing studs, in accordance with the principles of the present invention. The tool 10a includes an elongate staff 12, as described above with respect to the tool 10 of FIGS. 1-4. The tool 10a further includes an electrical box mounting fixture 14a slidably adjustably disposed on the staff 12, as described above. The staff 12 and mounting fixture 14a are similar to the staff 12 and mounting fixture described above, and similar features have been similarly numbered. In the embodiment shown, the mounting fixture 14a includes a central portion 60a having an elongate tongue 36 extending from a second side 38 of the mounting fixture 14a and engaging the slot 34 on the staff 12. The tongue 36 is defined by a pair of parallel grooves 40 formed into the second side 38 of the central portion 60 and sized to receive portions of the staff 12, as described above.

First and second side portions 62a, 64a of the mounting fixture 14a extend laterally from the central portion 60a. A plurality of channels 66a, 66b, 66c, 66d, 66e are formed into the first side 32 of the mounting fixture 14a to facilitate properly locating electrical boxes of various construction on the mounting fixture 14a. Planar surfaces 50a and 54a, 54b, 54c, 54d, 54e (FIG. 9) are defined by the central portion 60a and the first and second side portions 62a, 64a of the mounting fixture 14a, in cooperation with the channels 66a, 66b, 66c, 66d, 66e, to help locate the electrical boxes on the fixture 14a so that the electrical boxes will be positioned at the desired depth relative to the stud, as will be described below. The mounting fixture 14a further includes upper and lower flanges 90, 92 extending outwardly from the first side 32 of the central portion 60a to facilitate supporting electrical boxes on the mounting fixture 14a. The fixture 14a may further include upper and lower pins 30a, 30b extending from the first side 32 for engaging corresponding apertures provided on the electrical boxes for securing switches, outlets and other electrical hardware, in a manner similar to that described above.

In the embodiment shown, the mounting fixture 14a further includes magnets 94a, 94b provided on the first and second side portions 62a, 64a to facilitate installing metal electrical boxes on metal framing studs. The magnets 94a, 94b are positioned to magnetically engage a metal mounting stud and/or a metal electrical box and thereby help to maintain the electrical box in a desired position with respect to the framing stud.

The mounting fixture 14a may further include magnets 96a, 96b, 98a, 98b provided on the upper and lower flanges 90, 92 for magnetically engaging metal electrical boxes positioned on the mounting fixture 14a. In the embodiment shown, magnets 96a, 96b, 98a, 98b are provided on upper and lower surfaces of the upper and lower flanges 90, 92 to engage the front edges of upper and lower walls of an electrical box.

Figure 10:
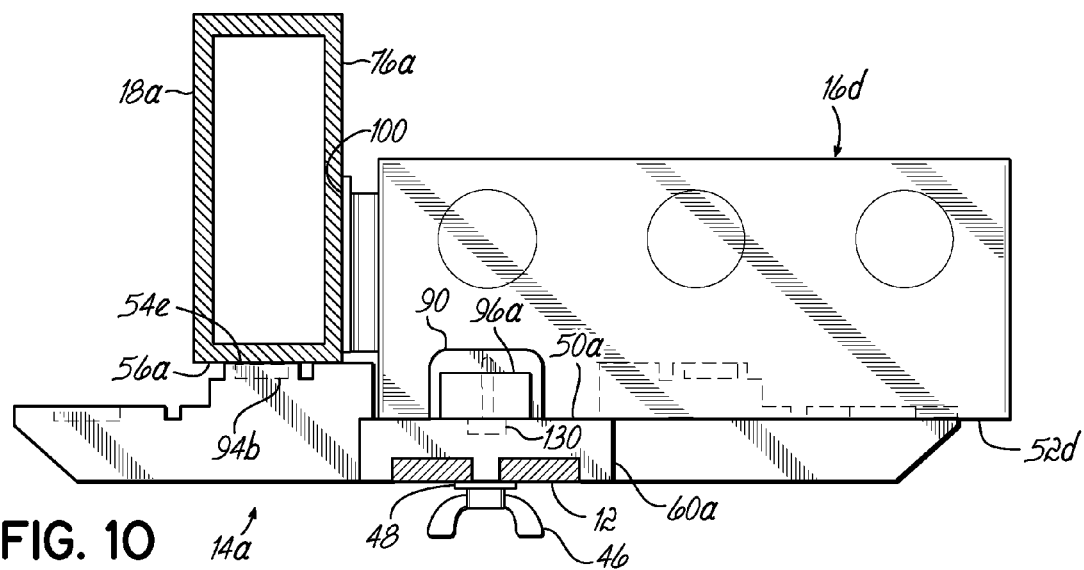
FIG. 10 is a top view of the tool of FIG. 6, illustrating use with a steel, three-gang, commercial electrical box.

FIGS. 10 and 10A depict the tool 10a of FIGS. 6-9 being used to install a steel, three-gang electrical box 16d to a metal stud 18a. The electrical box 16d is positioned on the mounting fixture 14a with a front edge 52d engaging a planar surface 50a defined by the central portion 60a. The electrical box 16d is positioned between the upper and lower flanges 90, 92 whereby pins 30a, 30b are received within corresponding apertures on the electrical box 16d for mounting switches, sockets, or other electrical hardware, in a manner similar to that described above with respect to tool 10. A magnet 130 may be provided on the mounting fixture 14a, adjacent pin 30a, to magnetically engage the electrical box 16d and help secure the electrical box 16d on the mounting fixture 14a. With a desired height selected by positioning the mounting fixture 14a along the length of the staff 12 and securing the mounting fixture 14a with reference to the graduations 20 provided on the staff 12, the tool 10a is placed adjacent a framing stud 18a such that a planar surface 54e defined by one of the side portions 62a, 64a and a side edge 100 of the electrical box 16d engage corresponding adjacent side edges 56a, 76a of the stud 18a. When metal studs 18a are used, a magnet 94b provided on one of the side portions 62a, 64a magnetically engages the stud 18a to facilitate installation. The electrical box 16d may thereafter be secured to the framing stud 18a using fasteners, as known in the art.

FIGS. 11 and 11A illustrate use of the tool 10a of FIGS. 6-9 for installing a 4-inch×4-inch electrical box 16e having a side mounting flange 110 that is adapted to be received over a framing stud 18a. The electrical box 16e is positioned on the mounting fixture 14a with a forward edge 52e of the electrical box 16e engaging a planar surfaces 54c, 54d (see FIG. 9), defined by channels 66b, 66d formed on the first side 32 of the side portions 62a, 64a. Upper and lower walls of the electrical box 16e are received between the upper and lower flanges 90, 92 and the magnets 96b, 98b provided on the respective flanges 90, 92 magnetically engage the electrical box 16e, as described above, to help secure the steel electrical box 16e to the mounting fixture 14a. With the mounting fixture 14a adjusted to a desired height along the staff 12, the tool 10a may be placed adjacent a framing stud 18a with the side flange 110 of the electrical box 16e received over the stud 18a as illustrated in FIG. 11. A magnet 94a provided on one of the side portions 62a, 64a of mounting fixture 14a magnetically engages the side mounting flange 110 to help support the electrical box, 16e on the fixture 14a. When metal framing studs 18a are used, the magnet 94a also magnetically engages the stud 18a to facilitate installation. The electrical box 16e may thereafter be secured to the framing stud 48a, as known in the art.

Figure 12:
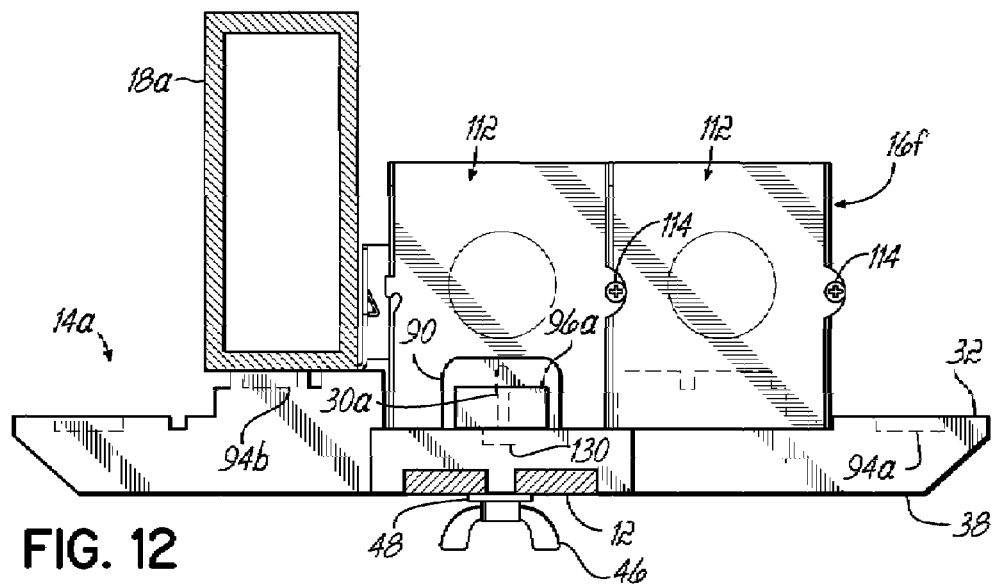
FIG. 12 is a top view of the tool of FIG. 6, illustrating use with an expandable, commercial electrical box having two gangs.

FIG. 12 illustrates use of the tool 10a of FIGS. 6-9 with an expandable electrical box 16f having two, separable gangs 112 joined by fasteners 114. The electrical box 16f is placed on the mounting fixture 14a with the forward edges 52f of one of the gangs 112 engaging the planar surface 50a defined by the central portion 60a of the mounting fixture 14a. The second gang 112 is received on the mounting fixture 14a and abuts planar surface 54b (see FIG. 9) defined by the channel 66 provided on one of the side portions 62a, 64a of the mounting fixture 14a. Upper and lower wall portions of the first gang 112 are received between the upper and lower flanges 90, 92 of the mounting fixture 14a and the magnet 130 magnetically engages the electrical box 16f to retain the electrical box 16f thereon. The pins 30a, 30b are received in corresponding apertures on the electrical box 16f in a manner similar to that described above for tool 10. With the mounting fixture 14a adjusted to a desired height along the staff 12, the tool 10a may be placed adjacent a framing stud 18a to position the electrical box 16f at a desired location with respect to the framing stud 18a, whereafter the electrical box 16f may be secured to the framing stud 18a, as known in the art.

Figure 13:
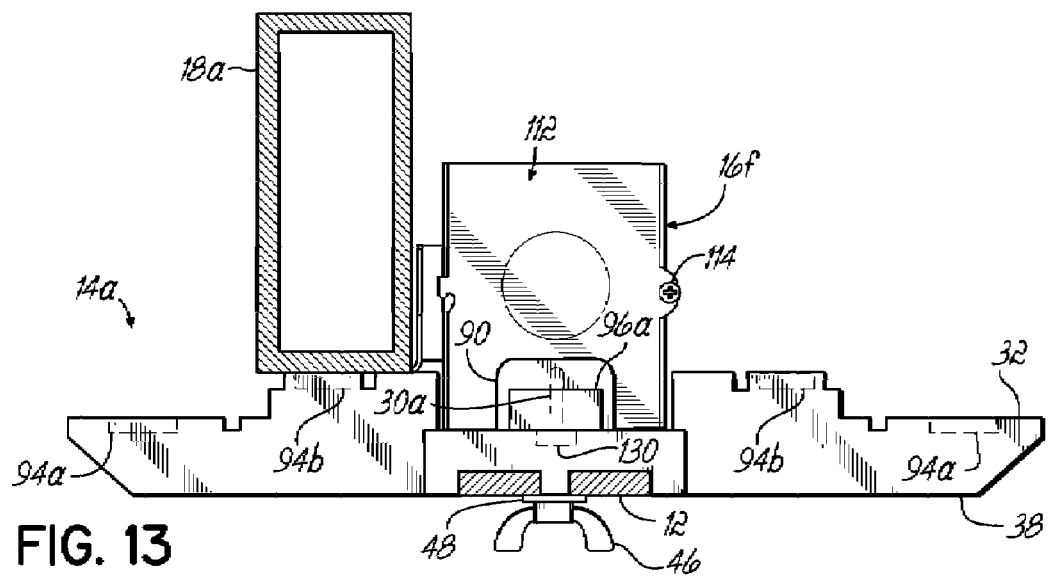
FIG. 13 is a top view of the tool of FIG. 6, illustrating use with a steel, single-gang, expandable electrical box.

FIG. 13 illustrates use of the tool 10a of FIGS. 6-9 with a single gang 112 of the expandable electrical box 16f, as described above with respect to FIG. 12.

Figure 14:
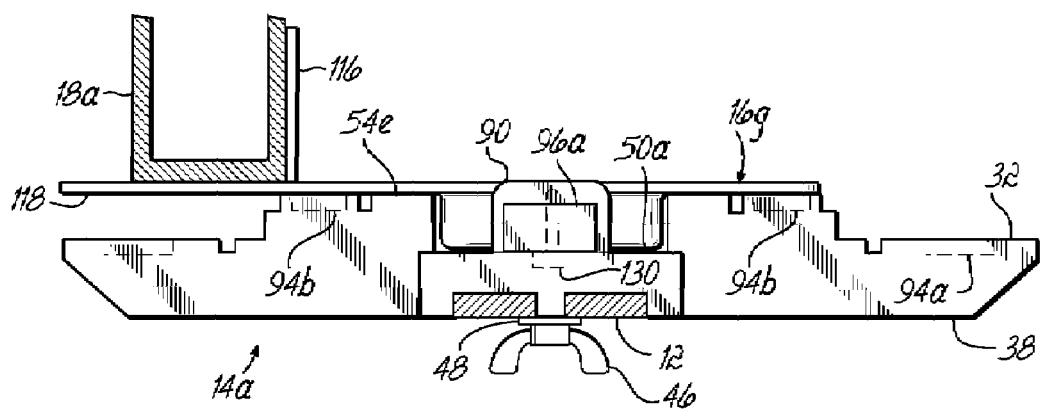
FIG. 14 is a top view of the tool of FIG. 6, illustrating use with a steel, 4-inch×4-inch, single-gang cover plate with a mounting flange.

FIG. 14 illustrates use of tool 10a of FIGS. 6-9 with a steel, 4-inch×4-inch, flanged, single-gang cover plate 16g having a mounting bracket 116 for securing the cover plate 16g to a framing stud 18a. The cover plate 16g is received within channel 66a defined between the central portion 60a and the first and second side portions 62a, 64a of the mounting fixture 14a. Pins 30a, 30b are received within corresponding apertures on the cover plate 16g. The flange 118 of the cover plate 16g engages a planar surface 54e defined by the first and second side portions 62a, 64a of the mounting fixture 14a, and magnets 94b magnetically engage the flange 118 to help retain the cover plate 16g thereon. With the mounting fixture 14a adjusted to a desired height along the staff 12, the tool 10a is positioned adjacent a framing stud 18a with the flange 118 and outwardly extending bracket 116 of the cover plate 16g engaging corresponding adjacent side surfaces of the framing stud 18a. The cover plate 16g may thereafter be secured to the framing stud 18a, as known in the art.

Figure 15:
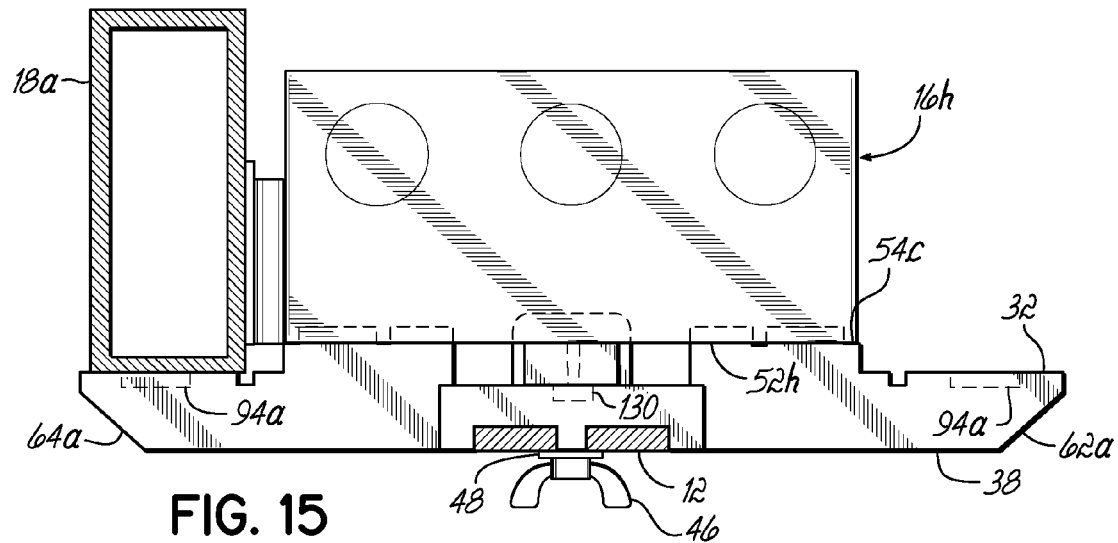
FIG. 15 is a top view of the tool of FIG. 6, illustrating use with a steel, 4 9/16 inch×4 9/16 inch electrical box with a mounting bracket.
Figure 15A:
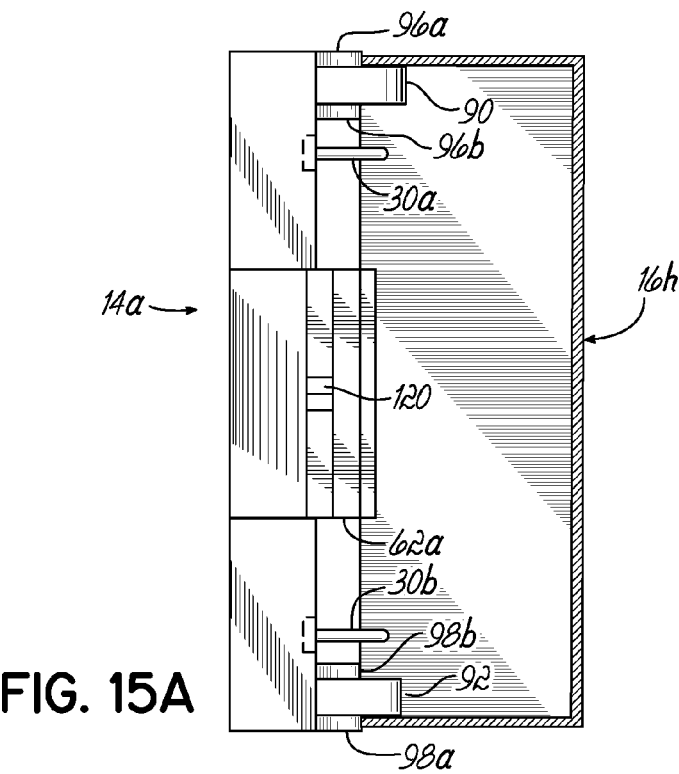
FIG. 15A is a partial, cross-sectional side-view of the tool and electrical box of FIG. 15.

FIGS. 15 and 15A illustrate use of the tool 10a of FIGS. 6-9 with a 4 9/16 inch by 4 9/16 inch, steel electrical box 16h. The electrical box 16h is received on the mounting fixture 14a with a forward edge 52h of the electrical box 16h engaging a planar surface 54c defined by channels 66b provided on the first and second side portions 62a, 64a. Upper and lower walls of the electrical box 16h are received on the outer sides of the upper and lower flanges 90, 92 whereby magnets 96a, 98a on the upper and lower flanges 90, 92 magnetically engage the electrical box 16h to retain the electrical box 16h thereon. With the mounting fixture 14a adjusted to a desired height indicated by the graduations 20 on the staff 12, the tool 10a, with the electrical box 16h mounted thereon, may be positioned adjacent a framing stud 18a with a planar surface 54a defined by one of the side portions 62a, 64a of the mounting fixture 14a abutting the framing stud 18a. When metal framing studs are used, a magnet 94a provided on one of the side portions 62a, 64a of the mounting fixture 14a magnetically engages the mounting stud 18a to facilitate positioning the tool 10a and electrical box 16h relative to the framing stud 18a. The electrical box 16h may thereafter be secured to the framing stud 18a, as known in the art.

Figure 6:
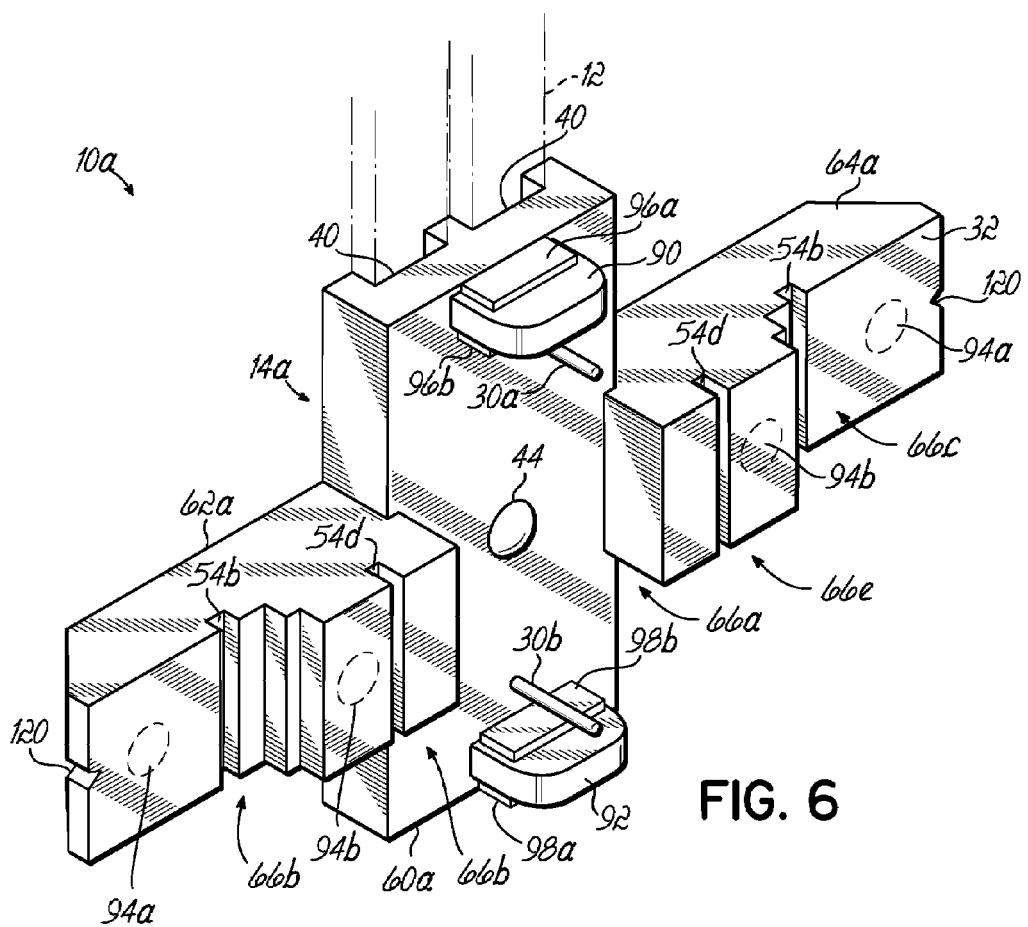
FIG. 6 is a perspective rear view of another exemplary tool for installing electrical boxes, in accordance with the principles of the present disclosure.
Figure 7:
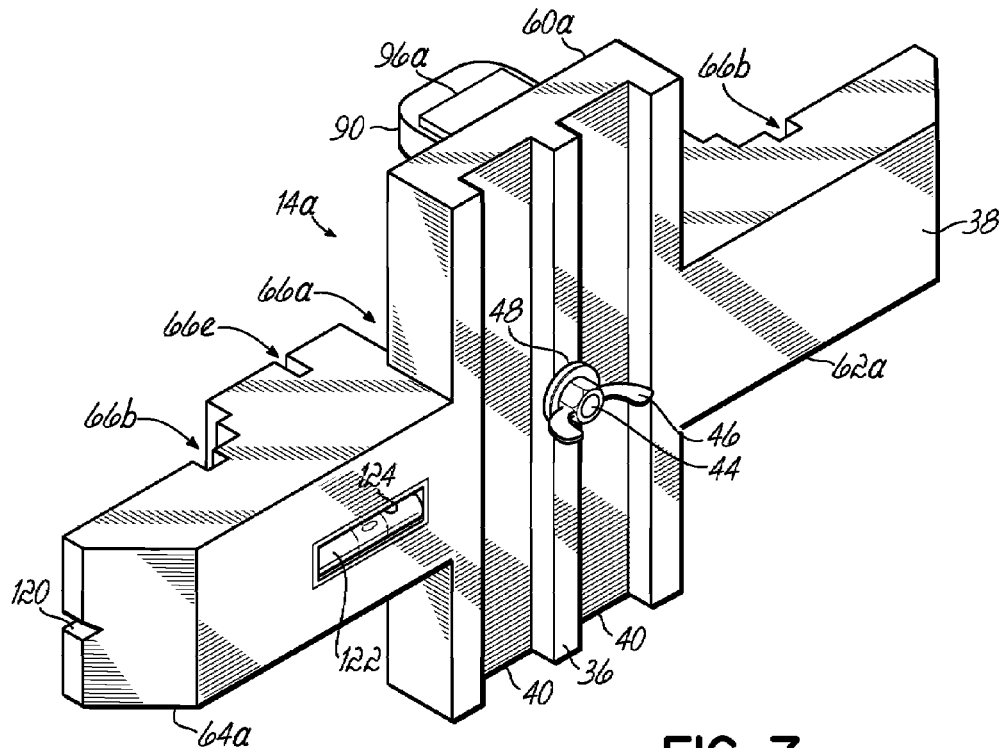
FIG. 7 is a perspective front view of the tool of FIG. 6, viewed from the opposite side.
Figure 8:
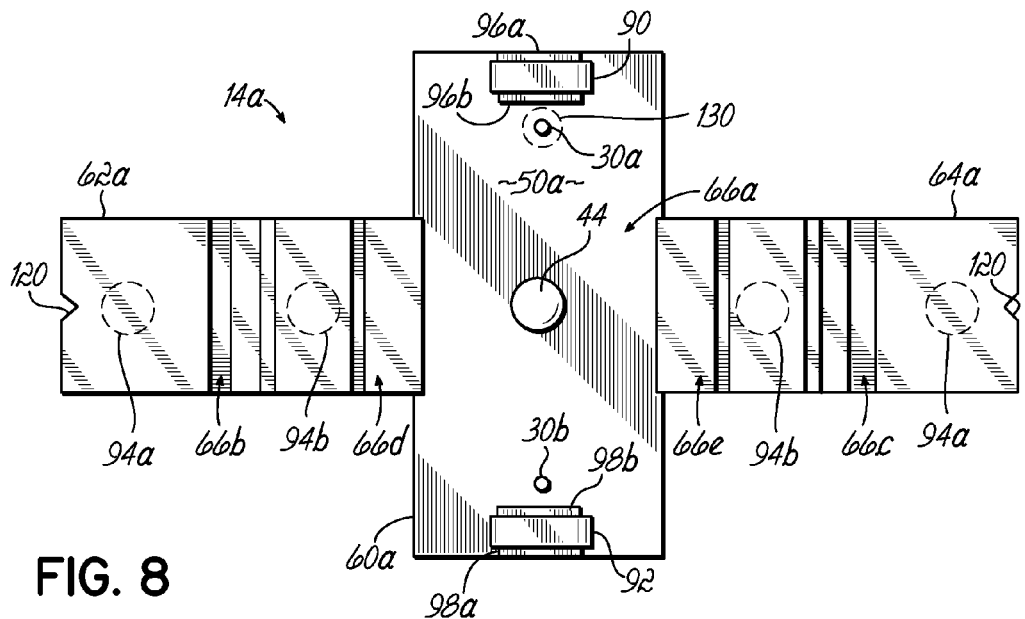
FIG. 8 is a rear elevation view of the tool of FIG. 6.

Referring now to FIGS. 6-8, tool 10a may further include notches 120 provided on mounting fixture 14a, at the outboard ends of side portions 62a, 64a. The notches 120 can be used to mark framing studs to indicate a desired height for mounting various other brackets or mounting fixtures, such as electrical box mounting caddies (not shown). Tool 10a may further include a level indicator, such as a bubble level 122 provided in a recess 124 on the second side 38 of mounting fixture 14a (see FIG. 7), to provide an indication when the side portions 62a, 64a of mounting fixture 14a are level. The end 22 of staff 12 may be rounded to facilitate aligning the tool with level. A magnet 130 may also be provided on mounting fixture 14a, adjacent one of the pins 30a, 30b to facilitate retaining metal electrical boxes on the fixture 14a.

Figure 16:
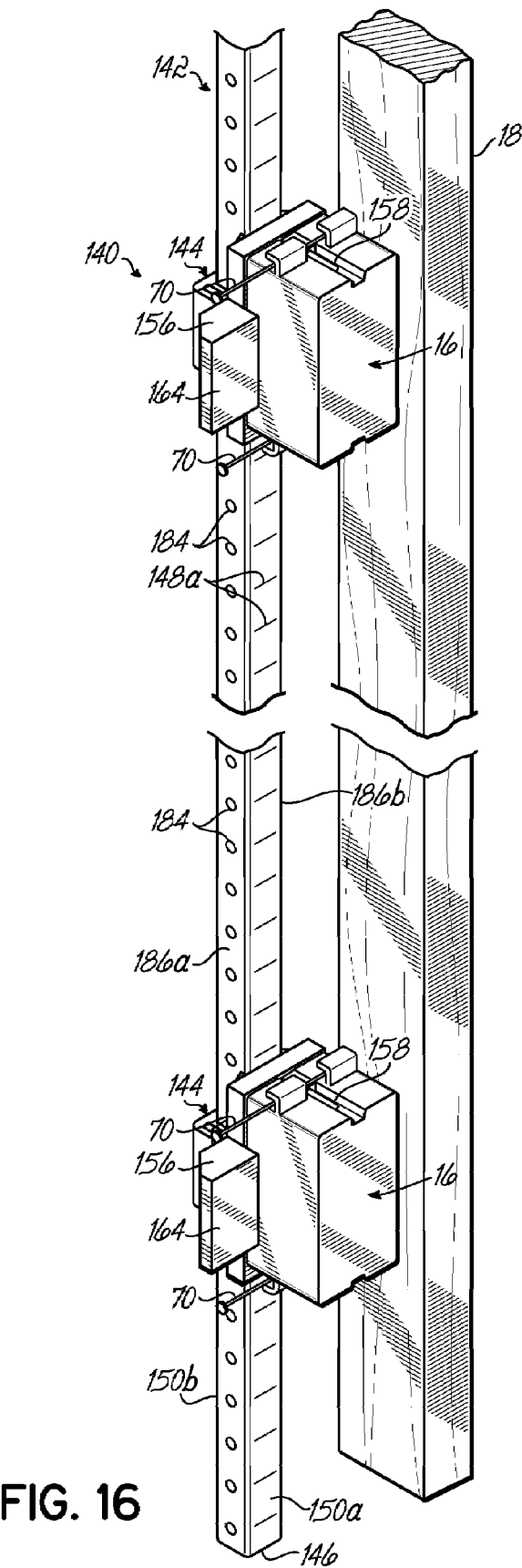
FIG. 16 is a perspective view of another exemplary tool for installing electrical boxes, in accordance with the principles of the present disclosure.
Figure 17A:
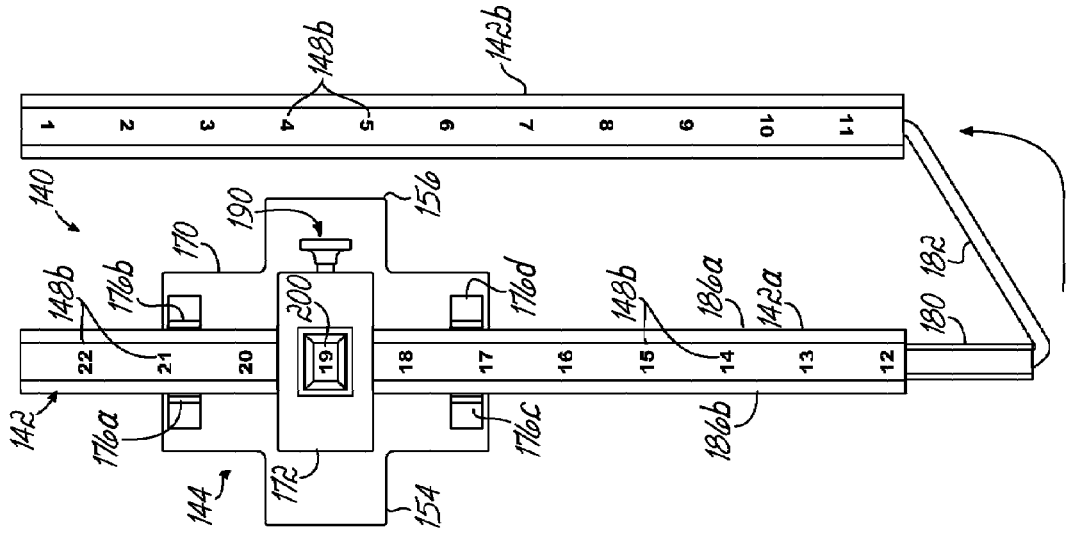
FIG. 17A is a front elevation view of the tool of FIG. 16.
Figure 17B:
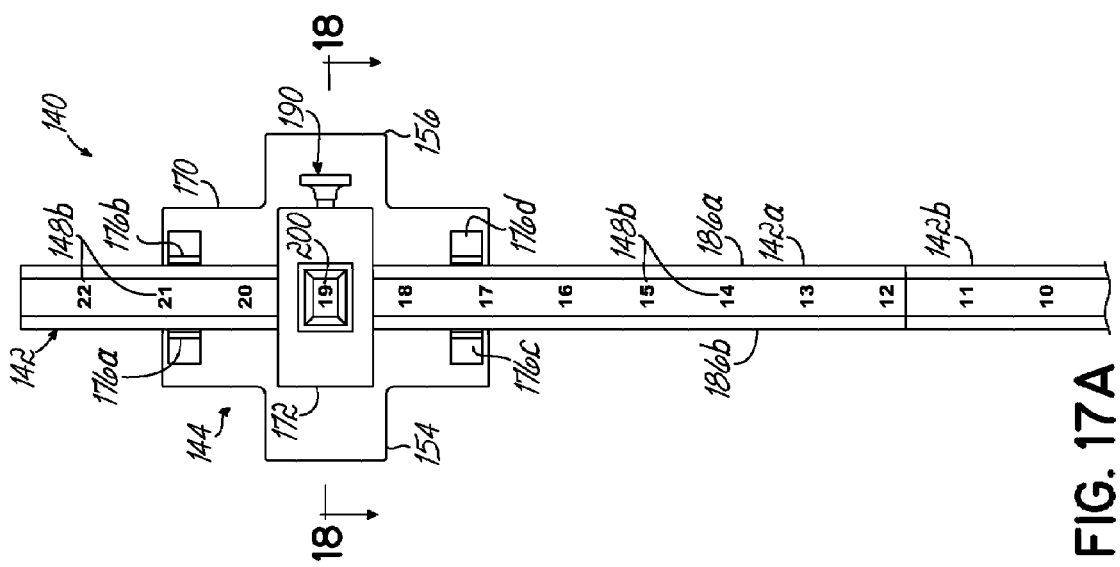
FIG. 17B is a front elevation view of the tool of FIG. 16, depicting an alternative configuration.

FIGS. 16, 17A and 17B depict another exemplary tool 140 for installing electrical boxes 16 in accordance with the present disclosure, similar to the tool 10 described above with reference to FIGS. 1-4. Tool 140 includes an elongate staff 142 supporting one or more electrical box mounting fixtures 144. The electrical box mounting fixtures 144 are slidably adjustable along the length of the staff 142 to desired positions for mounting the electrical boxes 16 to a framing stud 18 of a building. Graduations are provided on the staff 12 to define various distances from a lower end 146 of the staff 142 to facilitate locating the electrical boxes 16 at desired heights above a floor surface. The graduations may comprise hash marks 148a (FIG. 16), reference numerals 148b (FIG. 17A) corresponding to distances from the lower end 146 of the staff 142, or various combinations thereof, or other indicia. In one embodiment, graduations 148a, 148b are provided on opposite sides 150a, 150b of the staff 142. The graduations 148a, 148b on one side 150a of the staff 142 may be provided in a different unit of measure, or in a different measurement system than the graduations 148a, 148b provided on the oppositely disposed side 150b of the staff 142, to facilitate use of the tool 140 with different measurement systems. For example, graduations 148a, 148b on one side 150a of the staff 142 may be provided in inches, while graduations 148a, 148b on the opposite side 150b of the staff 142 may be provided in centimeters.

Figure 18:
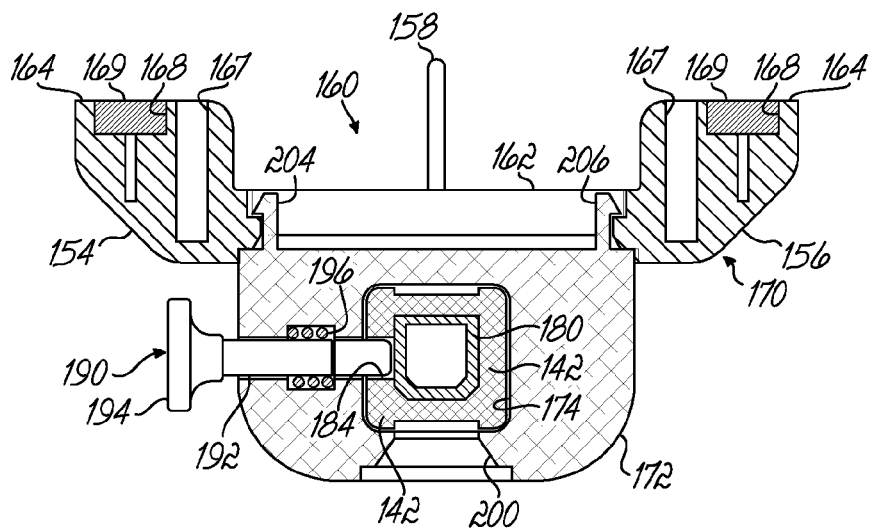
FIG. 18 is a cross-sectional view of the tool of FIG. 17A, taken along line 18-18.
Figure 19:
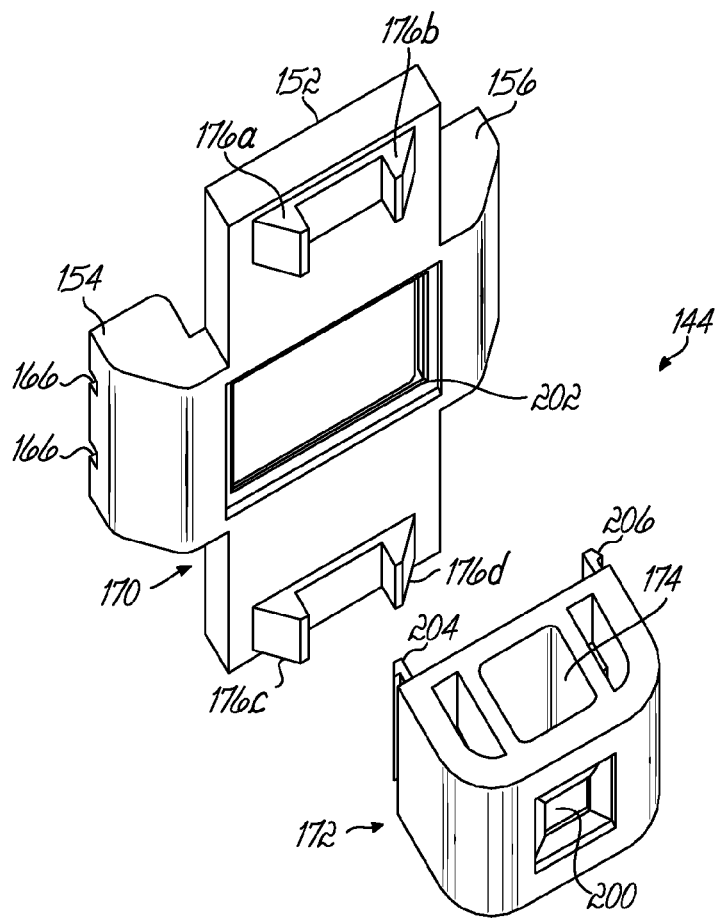
FIG. 19 is a perspective view of an exemplary mounting fixture for use with the tool of FIG. 16.

With continued reference to FIGS. 16, 17A, and 17B, and referring further to FIGS. 18-19, mounting fixture 144 is similar to the mounting fixture 14 discussed above with respect to FIGS. 1-4, including a central portion 152 and first and second side portions 154, 156 extending laterally from the central portion 152, on opposite sides thereof. Mounting fixture 144 further includes a pin 158 extending from a first side 160 of the mounting fixture 144 for engaging and supporting electrical boxes 16 during use of the tool 140, and first and second planar surfaces 162, 164 on the first side 160 for engaging the front edge of the electrical box 16 and the framing stud 18, respectively, in a manner similar to that described above. The mounting fixture 144 may also include notches 166 on the outer surfaces of the side portions 154, 156 for accommodating wire-entry/wire-retaining features of plastic electrical boxes, as discussed above. Various other features may be provided on mounting fixture 144, such as slots 167 for accommodating different types of electrical boxes, recesses 168 for receiving magnets 169, or other features such as those described above with respect to FIGS. 1-15.

Instead of a tongue for engaging a slot formed in a staff, the mounting fixture 144 comprises a first body portion 170 that includes the first and second planar surfaces 162, 164, and a second body portion 172 that is configured to be slidably coupled to the staff 142. In the embodiment shown, the second body portion 172 includes a bore 174 shaped complimentarily to the staff 142 and the staff 142 is slidably received within the bore 174. The mounting fixture 144 is therefore slidably movable along the length of the staff 142 to various desired positions for supporting an electrical box 16, as will be described in more detail below. The mounting fixture 144 may further include guides 176a, 176b, 176c, 176d provided on the first body portion 170 and cooperating with the bore 174 through the second body portion 172 to maintain alignment of the mounting fixture 144 on the staff 142.

While the mounting fixture depicted in FIGS. 16-19 is similar in configuration to the mounting fixture 14 depicted in FIGS. 1-4, it will be appreciated that various other embodiments of mounting fixtures, such as mounting fixtures similar to the various other embodiments described herein, may alternatively be used with the staff 142 depicted in FIGS. 16, 17A, and 17B, as may be desired to accommodate various other types of electrical boxes.

With continued reference to FIGS. 17A and 17B, the staff 142 comprises at least two sections 142a, 142b that may be selectively coupled together to define the elongate structure that slidably supports the mounting fixture 144. In the embodiment shown, the first and second sections 142a, 142b are convertible between a first configuration wherein the first and second sections 142a, 142b are coupled together in an end-to-end arrangement, as depicted in FIG. 17A, and a second configuration wherein the first and second sections 142a, 142b are disposed in a side-by-side arrangement, as depicted in FIG. 17B. The second configuration facilitates transportation and storage of the tool 140 in a compact space.

The first and second sections 142a, 142b may be securely coupled together by a connecting member 180 fixed to one of the first and second sections 142a, 142b and configured to be removably coupled to the other of the first and second sections 142a, 142b. In the embodiment shown in FIG. 17B, the connecting member 180 comprises a projection fixed to one end of the first section 142a and configured to be received within a complimentarily-shaped aperture formed in the second section 142b. The first and second sections 142a, 142b of the staff 142 may also be coupled together by a tether 182 extending between the first and second sections 142a, 142b. The tether 182 maintains the first and second sections 142a, 142b in close proximity for ease of assembly to the first configuration when needed, and in one aspect, the tether 182 may comprise an elastic member configured to bias the first and second sections 142a, 142b to the first configuration. While FIGS. 17A and 17B depict a staff 142 comprising first and second sections 142a, 142b, it will be appreciated that the staff 142 may alternatively comprise three or more sections that may be converted between first and second configurations, in a manner similar to that described above.

The tool 140 may further include detents associated with the staff 142 to facilitate aligning a mounting fixture 144 in registration with a selected one of the graduations 148a, 148b. In the embodiment shown, the staff 142 includes detents in the form of apertures 184 spaced at intervals along the length of the staff 142 to correspond to the graduations 148a, 148b. When the staff 142 includes different types of graduations 148a, 148b on the first and second sides 150a, 150b, two different sets of detents may be provided, such as on opposite lateral surfaces 186a, 186b of the staff 142 for example.

With continued reference to FIGS. 17A and 17B, and referring further to FIG. 18, the mounting fixture 144 may further include a selector 190 cooperating with and positively engaging the detents to facilitate aligning the mounting fixture 144 in registration with the graduations 148a, 148b. In the embodiment shown, the selector 190 comprises a pin 192 configured to be received in the apertures 184 spaced along the length of the staff 142. A selector knob 194 is provided at a distal end of the pin 192 to facilitate engaging and withdrawing the pin 192 from a selected one of the apertures 184. The pin 192 may be biased, such as by a spring 196 or other resilient member, in a direction for engagement with the apertures 184. The mounting fixture 144 may further include a window 200 configured to display one of the graduations 148a, 148b on the staff 142. The relative spacing between the window 200 and the selector 190 is such that the graduation 148a, 148b displayed through window 200 corresponds to the selected distance from the floor surface that the center of the electrical box 16 will be located with the mounting fixture at that position on the staff 142.

FIGS. 18 and 19 depict an embodiment of the mounting fixture 144, wherein the first and second body portions 170, 172 are formed as separate components that may be selectively joined together. In this embodiment, the first body portion 170 includes a generally rectangular aperture 202 formed through the first body portion 170, and the second body portion 172 includes first and second tines 204, 206 configured to engage the aperture 202 such that the second body portion 172 is snap fit to the first body portion 170. It will be appreciated, however, that the first and second body portions 170, 172 of the mounting fixture 144 may be selectively coupled together by various other methods, or may alternatively be formed as an integral piece.

While the present invention has been illustrated by the description of exemplary embodiments thereof, and while the embodiments have been described in considerable detail, they are not intended to restrict or in any way limit the scope of the appended claims to such detail. The various features discussed herein may be used alone or in any combination. Additional advantages and modifications will readily appear to those skilled in the art. The invention in its broader aspects is therefore not limited to the specific details, representative apparatus and method and illustrative examples shown and described. Accordingly, departures may be made from such details without departing from the scope or spirit of the general inventive concept.

What is claimed is:

1. A tool for installing electrical boxes, comprising:
    an elongate staff comprising at least first and second sections, said staff convertible between a first configuration wherein said first and second sections are coupled together in a coaxial, end-to-end arrangement, and a second configuration wherein said first and second sections are disposed in a non-coaxial arrangement for storage of the tool;
    an electrical box mounting fixture slidably adjustably disposed on said staff, said mounting fixture having a first side and a second side;
    graduations on said staff, said graduations defining predetermined spacings from a center of the electrical box to an end of said staff;
    a first planar surface on said first side of said mounting fixture and adapted to engage an open end of the electrical box; and
    a second planar surface on said first side of said mounting fixture and adapted to engage a framing stud;
    said first and second planar surfaces spaced relative to one another to define a mounting depth position of the electrical box relative to the framing stud.

2. The tool of claim 1, wherein said first and second sections are disposed in a side-by-side arrangement in said second configuration.

3. The tool of claim 1, wherein said first section is folded adjacent said second section in said second configuration.

4. The tool of claim 3, wherein said first and second sections are operatively coupled by a tether extending between said first and second sections.

5. The tool of claim 4, wherein said tether comprises an elastic member configured to bias said first and second members to said first configuration.

6. The tool of claim 1, further comprising:
    a plurality of detents on said staff;
    said detents cooperating with said mounting fixture to facilitate aligning said mounting fixture in registration with one of said graduations.

7. The tool of claim 6, further comprising:
    a selector on said mounting fixture, said selector operatively engageable with at least one of said detents on said staff to facilitate aligning said mounting fixture in registration with one of said graduations.

8. The tool of claim 7, wherein said detents comprise apertures formed in said staff and said selector comprises a pin configured to be received in said apertures.

9. The tool of claim 8, wherein said pin is biased for engagement with said apertures.

10. The tool of claim 1, wherein said mounting fixture comprises a first portion defining said first and second planar surfaces, and a second portion adapted to be slidably coupled to said staff, said first portion selectively coupled to said second portion.

* * * * *